March 21, 1944.  H. B. WARREN  2,344,575
METHOD OF MANUFACTURING MOLDING STRIPS
Filed Jan. 21, 1941
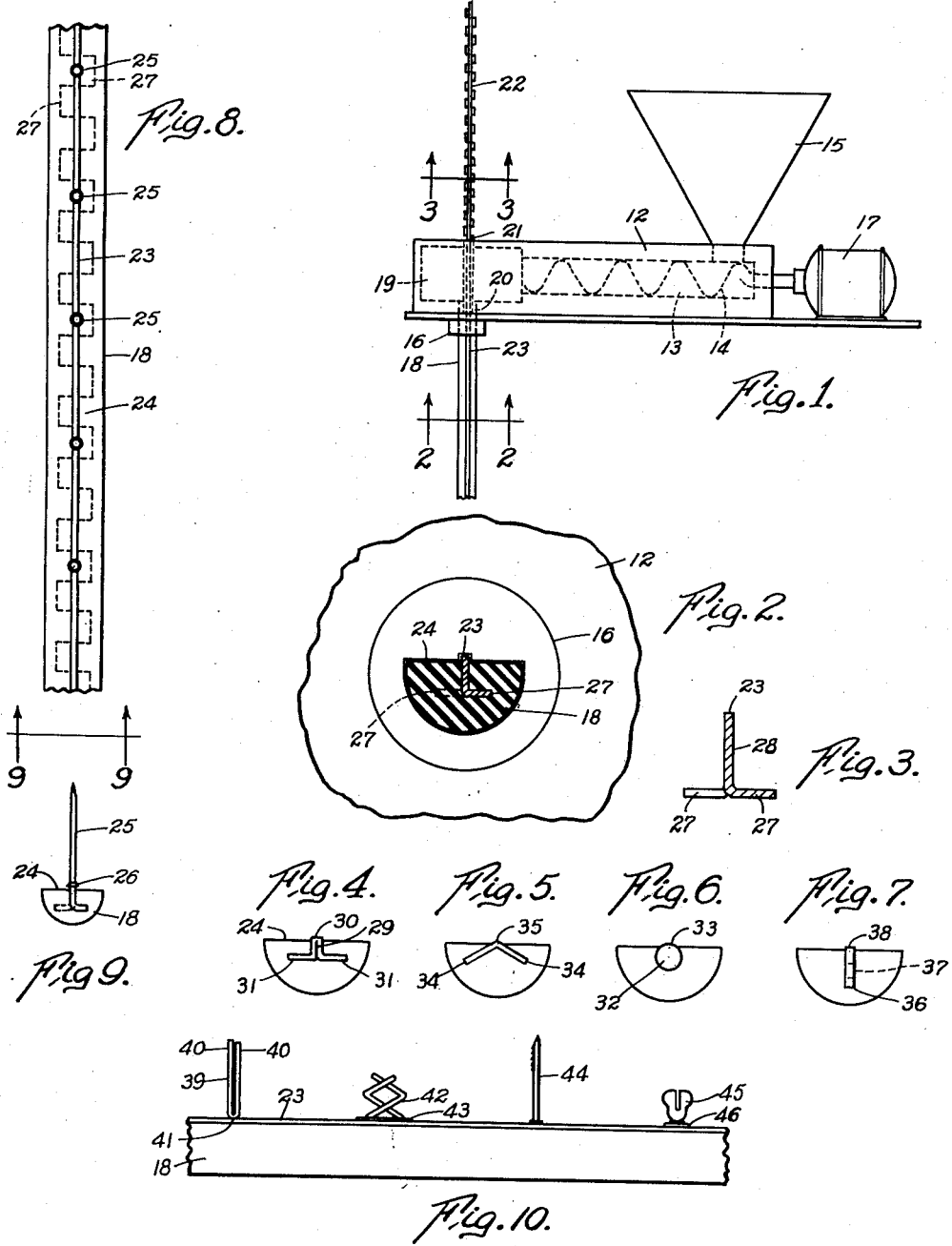
Harold B. Warren
INVENTOR
BY Zugelter and Zugelter
ATTORNEYS Patented Mar. 21, 1944

2,344,575

UNITED STATES PATENT OFFICE 2,344,575

METHOD OF MANUFACTURING MOLDING STRIPS

Harold B. Warren, Cincinnati, Ohio

Application January 21, 1941, Serial No. 375,289

2 Claims. (Cl. 18—59)

This invention relates to a molding strip and method of manufacture, the strip being of the general character suitable for use as an upholstery trim and as a finishing strip for wall panels, refrigerators, vehicle body equipment, and the like.

An object of the invention is to greatly simplify the manufacture and to reduce the cost of molding strips such as are referred to above.

Another object of the invention is to provide a molding strip of great durability, having a pleasing appearance when applied, and which possesses great flexibility for facilitating application thereof to a body or structure requiring trimming or finishing.

A further object of the invention is to provide a molding strip capable of being manufactured by means of a simple extrusion or rolling operation wherein a metallic spine piece or reinforcing insert is molded into the body of the strip concurrently with the shaping of the strip body.

Another object consists in the development of a novel and simple method of fabrication which is especially constituted to condition the molding for the application of nails or other fasteners to the molding spine piece in a highly simplified manner.

The foregoing and other objects are attained by the means described herein and disclosed in the accompanying drawing, in which:

Fig. 1 is a side elevational view of an extrusion apparatus such as might be employed in fabricating the molding strip of the invention.

Fig. 2 is an enlarged cross sectional view taken on line 2—2 of Fig. 1.

Fig. 3 is an enlarged cross sectional view taken on line 3—3 of Fig. 1.

Figs. 4, 5, 6 and 7 are end views of representative forms of molding strips capable of being manufactured in accordance with the invention.

Fig. 8 is a plan view of the molding strip illustrated by Fig. 2, with fasteners attached.

Fig. 9 is an end view taken on line 9—9 of Fig. 8.

Fig. 10 is a side elevational view of a molding strip of the invention, showing representative types of fasteners with which the strip may be equipped.

Prior to the invention herein disclosed, it was customary to manufacture molding strips from plastic material such as rubber, but the practice was to bury the reinforcing insert in such a way that fastening means could not be readily attached. When fastening means were employed they usually took the form of external clamps, which detracted from the finished appearance of plastic materials when they were colored or finished in accordance with any particular decorative scheme. External clamps required a separate part; therefore, greater expense was involved in attaching the molding. The finished assembly was also weaker, as the clamps were not an integral part of the molding proper. Another method formerly used was to drill and tap the molding for the use of screws as a fastening means, but this was expensive, as it did not lend itself to continuous production methods. All of the stated disadvantages, as well as others of lesser importance have been obviated by means of the present invention.

With reference to the accompanying drawing the character 12 indicates an extrusion machine having a chamber 13 which houses a screw 14 that advances a flexible plastic material of any description from the hopper 15 to the extrusion die 16. Any suitable source of power such as a motor 17 may be employed for driving the screw or any equivalent plastic advancing medium. As will be understood, the extrusion machine, in accordance with common practice, will be equipped with the necessary thermal controls to insure ejection of the plastic material through the die 16 in proper condition for shaping the body 18 of the molding strip. If necessary or desirable, auxiliary shaping means in the form of rollers or the like may be resorted to for securing a proper or desired contour of the molding strip body. Such rollers are not illustrated herein, since in actual practice they are not ordinarily required. It will be observed that the extruding machine includes a collecting chamber 19 having a port 20 through which the moldable plastic is fed to the die.

At the location 21, the machine has an opening through which may be fed the metallic reinforcing insert or spine piece 22 in order that said insert or spine piece may pass through the die along with the plastic material so as to form the molded assembly illustrated by Fig. 2. The metallic reinforcing insert or spine piece may be shaped in various ways, for example as illustrated in Figs. 3 to 7 inclusive, all of which will be referred to in greater detail hereinafter.

As is readily evident by referring to the several drawing figures illustrating the molding strip, the strip when leaving the die 16 presents an initially exposed contact edge 23 of the insert or spine piece, which contact edge extends outwardly a limited distance from the flat base portion 24 of the plastic body 18. The degree of extension of the exposed contact edge 23 may be as little as a few thousandths of an inch, or if desired, it may be somewhat greater, the principal consideration being that the contact edge be immediately accessible for the welding of suitable fasteners thereto preferably without the need for special handling or machine operations subsequently to the extrusion or rolling operation. The actual welding operation, of course, is to be a separate operation but no intermediate operation is required other than brightening the contact edge 23 for welding of a fastener thereto.

As illustrated by Figs. 8 and 9, the molding strip body with its insert or spine piece embedded therein during the formation of the strip, may have applied thereto by means of a spot-welding operation, the nails or other fasteners indicated at 25. The nails preferably have heads 26 which bear directly against the exposed contact edge 23 of the spine piece, to which they are welded preferably in regular spaced relationship along the center line of the flat base portion 24. The welding operation is performed by means of automatic machinery, and as a continuous process.

In that form of metallic reinforcing insert or spine piece illustrated by Figs. 1, 2, 3, 8 and 9, anchorage ears 27 may be formed thereon by merely bending alternate portions of the metal in opposite directions at an angle to the part 28 which includes the contact edge 23. The part 28 will ordinarily be disposed substantially at right angles to the substantially flat base 24 of the molding strip body.

In the modification illustrated by Fig. 4, the spine piece may comprise a ribbon of metal bent upon itself as at 29 to present a contact edge 30 and a pair of ears 31—31, the contact edge extending slightly beyond the flat base portion 24 of the body as previously explained.

In accordance with Fig. 6, the spine piece is constructed of a length of round wire or rod stock 32, the major portion of which is embedded in the molding body, leaving an exposed contact edge 33 to which a fastener may be welded.

In Fig. 5, the spine piece is constituted of a metallic ribbon which is simply bent along its medial line to furnish anchorage legs 34—34 and an exposed contact edge 35 suitable to receive the welded fastener.

In that form of spine piece illustrated by Fig. 7, the metallic ribbon 36 is simply drilled or punched at intervals, as indicated at 37, to form a strong mechanical lock with the plastic. In this form as well as all other forms illustrated, exposed contact edge 38 is formed initially as the molding strip leaves the die of the extrusion machine. In every case, the spine piece or reinforcing insert is fed through the die along with the plastic material. Inasmuch as the solidified portion of the molding strip beneath the die tenaciously grips the spine piece or insert progressively, it will be found unnecessary to provide a separate feed for advancing the metallic insert or spine piece through the die.

The type of fastener to be welded onto the exposed contact edge of the molding strip will depend largely upon the use contemplated for the completed molding strip, and accordingly Fig. 10 is offered for showing several different types of fasteners. The fastener 39 is what may be considered a staple having legs 40—40 of flexible metal to be bent outwardly after the fastener has been inserted into an aperture or slot, in much the manner of a cotter pin. The fastener 39 is welded to the exposed contact edge 23 of the spine piece at the location 41. At 42 is indicated a common form of spring metal fastener having a head 43 welded to the contact edge. At 44 is indicated a nail having its head welded to the contact edge, said nail being furnished with barbs.

At the extreme right of Fig. 10 is illustrated a glove fastener 45 or one of similar design, which has its base 46 welded to the exposed contact edge of the molding strip in the manner heretofore explained.

With reference to Figs. 3 to 7 inclusive it will be noted that the spine pieces of Figs. 3, 6 and 7 are such as will readily permit bending of the finished molding strip laterally in the plane of the flat base portion of the body, whereas the spine pieces of Figs. 4 and 5 are designed to resist bending in that direction to some extent. The shape and form of the spine pieces will ordinarily be determined by the use to which the molding strip is to be placed, depending upon whether the molding strip shall be easily bent laterally in the plane of the base portion, or curved so as to impart a concavity or convexity to the flat base portion.

As will be understood, it is necessary that the reinforcing insert or spine piece be of metal in order that the fasteners may be welded thereto. The plastic material of the molding strip body should be an electric insulator, and may therefore be of any one of a great number of plastics having that characteristic. The material of the molding strip body should be flexible and capable of withstanding an extrusion or rolling operation as previously explained. The molding strip ordinarily is applied using a mallet or the like, and when so applied neither the fasteners nor the spine pieces are exposed to the blows of the mallet and consequently they will not protrude through the body of the molding strip to mark or mar the appearance of the strip.

From the foregoing it will be understood that the method herein disclosed is not slow and costly like previous methods, but is instead rapid and continuous in operation, so that a great saving of time and labor is effected in the manufacture. The metallic reinforcing insert or spine piece may be of any desired gauge metal, as may be required. Depending upon the shape of the die, the molding strip body may be given various shapes or decorative characteristics, and its base area of course may be shaped to fit any supporting contour in addition to the flat support hereinbefore assumed. In the majority of installations, the base area indicated at 24 will be flat or substantially so, but it is not necessarily thusly limited because the invention applies regardless of variations in the shape or size of the base. As will readily be evident, the die may in some cases be designed to extrude a molding having a grooved base, a ribbed base, or one of other special shape or character. Various other modifications and changes in the details of the device may be made, within the scope of the appended claims without departing from the spirit of the invention.

What is claimed is:

1. The method of manufacturing a molding strip or the like, which method comprises extruding through a die a quantity of plastic material to form the body and mounting base area of the molding strip, while at the same time directing a metallic spine piece through the die along with the plastic material in such manner as to initially expose a limited area of the embedded spine piece metal through the mounting base area, and thereafter spot welding a series of fasteners at spaced intervals to the exposed area of the spine piece.

2. The method of manufacturing a molding strip or the like, which method comprises passing through a forming means a quantity of plastic material to shape the body of the molding strip, while at the same time directing a metallic spine piece through the same forming means with a contact edge of the spine piece protected from coverage with plastic material, thereby to initially and during the shaping operation produce a readily accessible fastener supporting area upon the molding strip, and thereafter thermally uniting a fastener to said contact edge which forms the supporting area aforesaid.

HAROLD B. WARREN.